(12) United States Patent
Adler et al.

(10) Patent No.: US 9,978,365 B2
(45) Date of Patent: May 22, 2018

(54) METHOD AND SYSTEM FOR PROVIDING A VOICE INTERFACE

(75) Inventors: Mark R. Adler, Lexington, MA (US); Imre Kiss, Arlington, MA (US); Joseph H. Polifroni, Arlington, MA (US); Tao Wu, North Andover, MA (US)

(73) Assignee: Nokia Technologies Oy, Espoo (FI)

( * ) Notice: Subject to any disclaimer, the term of this patent is extended or adjusted under 35 U.S.C. 154(b) by 1080 days.

(21) Appl. No.: 12/263,012

(22) Filed: Oct. 31, 2008

(65) Prior Publication Data

US 2010/0114944 A1 May 6, 2010

(51) Int. Cl.
*G06F 3/16* (2006.01)
*G10L 15/22* (2006.01)
*G10L 13/027* (2013.01)
*G10L 15/18* (2013.01)

(52) U.S. Cl.
CPC .............. *G10L 15/22* (2013.01); *G06F 3/167* (2013.01); *G10L 13/027* (2013.01); *G10L 15/1822* (2013.01); *G10L 2015/228* (2013.01)

(58) Field of Classification Search
CPC .. G06F 3/167; H04L 67/02; H04M 2201/405; H04M 3/4938
See application file for complete search history.

(56) References Cited

U.S. PATENT DOCUMENTS

| | | | |
|---|---|---|---|
| 5,915,001 A * | 6/1999 | Uppaluru | H04M 3/4938 379/88.17 |
| 6,418,440 B1 * | 7/2002 | Kuo et al. | |
| 6,446,081 B1 * | 9/2002 | Preston | G06F 17/2705 |
| 6,615,172 B1 * | 9/2003 | Bennett et al. | 704/257 |
| 7,027,987 B1 * | 4/2006 | Franz et al. | 704/236 |
| 7,036,128 B1 | 4/2006 | Julia et al. | |
| 7,493,259 B2 * | 2/2009 | Jones et al. | 704/257 |
| 7,526,476 B2 * | 4/2009 | Naam et al. | |
| 7,643,822 B2 * | 1/2010 | Ling et al. | 455/414.3 |
| 7,693,720 B2 * | 4/2010 | Kennewick et al. | 704/257 |
| 7,809,570 B2 * | 10/2010 | Kennewick et al. | 704/257 |

(Continued)

FOREIGN PATENT DOCUMENTS

| | | |
|---|---|---|
| CN | 1514387 A | 7/2004 |
| CN | 1938681 A | 3/2007 |

(Continued)

OTHER PUBLICATIONS

"Towards the Automatic Generation of Mixed-Initiative Dialogue System from Web Content", Joseph Polifroni, et al., Proc., Eurospeech, Sep. 2003, 4 pages.

(Continued)

*Primary Examiner* — Ashish K Thomas
*Assistant Examiner* — Mellissa M Ohba
(74) *Attorney, Agent, or Firm* — Banner & Witcoff, Ltd.

(57) ABSTRACT

A classifier voice interface of a user terminal may receive a query, may parse the query to identify an attribute, and may process the query to select a first domain-specific voice interface of a plurality of domain-specific voice interfaces based on the attribute, wherein each of the domain-specific voice interfaces comprises specialized information to process queries of different types. The classifier voice interface may further instruct the first domain-specific voice interface to process the query.

24 Claims, 7 Drawing Sheets

(56) References Cited

U.S. PATENT DOCUMENTS

| | | | | |
|---|---|---|---|---|
| 7,917,367 | B2* | 3/2011 | Di Cristo et al. | 704/270.1 |
| 7,949,529 | B2* | 5/2011 | Weider et al. | 704/270 |
| 8,015,006 | B2* | 9/2011 | Kennewick et al. | 704/236 |
| 8,112,275 | B2* | 2/2012 | Kennewick et al. | 704/257 |
| 2002/0103644 | A1 | 8/2002 | Brocious et al. | |
| 2003/0061054 | A1 | 3/2003 | Payne et al. | |
| 2003/0182131 | A1 | 9/2003 | Arnold et al. | |
| 2004/0044952 | A1* | 3/2004 | Jiang et al. | 715/500 |
| 2004/0193420 | A1* | 9/2004 | Kennewick et al. | 704/257 |
| 2005/0010393 | A1 | 1/2005 | Danieli et al. | |
| 2006/0069664 | A1* | 3/2006 | Ling et al. | 707/1 |
| 2006/0112034 | A1* | 5/2006 | Okamoto | B25J 5/007 706/16 |
| 2006/0184476 | A1 | 8/2006 | Kemper et al. | |
| 2007/0033005 | A1 | 2/2007 | Cristo et al. | |
| 2007/0050191 | A1* | 3/2007 | Weider et al. | 704/275 |
| 2007/0124263 | A1 | 5/2007 | Katariya et al. | |
| 2008/0189110 | A1 | 8/2008 | Freeman et al. | |
| 2008/0319947 | A1* | 12/2008 | Latzina et al. | 707/3 |
| 2009/0150156 | A1* | 6/2009 | Kennewick et al. | 704/257 |
| 2009/0299853 | A1* | 12/2009 | Jones et al. | 705/14.46 |

FOREIGN PATENT DOCUMENTS

| | | |
|---|---|---|
| CN | 1984190 A | 6/2007 |
| CN | 1993732 A | 7/2007 |
| CN | 101128818 A | 2/2008 |
| CN | 101189659 A | 5/2008 |
| EP | 1699042 | 9/2006 |
| WO | 9808215 | 2/1998 |
| WO | 0250818 | 6/2002 |
| WO | 2007056132 A2 | 5/2007 |

OTHER PUBLICATIONS

"Intensional Summaries as Cooperative Responses in Dialogue: Automation and Evaluation", Joseph Polifroni, et al., Proceedings of ACL-08, Jun. 2008, pp. 479-487.

"Evaluating Effectiveness and Portability of Reinforcement Learned Dialogue Strategies with Real Users: The Talk TownInfo Evaluation", Oliver Lemon, et al., Proc., IEEE/ACL SLT, Dec. 10-13, 2006, 4 pages.

"Information Presentation in Spoken Dialogue Systems", Vera Demberg, et al., Proc., EACL, Apr. 2006, pp. 65-72.

"Using Markov Decision Process for Learning Dialogue Strategies", Esther Levin, et al., Proc., ICASSP, May 1998, 4 pages.

"How may I help you?", A.L. Gorin, et al., Speech Communication 23 (May 1997) pp. 113-127.

"Decisions with Multiple Objectives: Preferences and Values Tradeoffs", R. Keeney, et al., John Wiley and Sons, 1976, Excerpt pp. 288-291.

"Flexible and Personalizable Mixed-Initiative Dialogue Systems", James Glass, et al., Spoken Language Systems Group, Laboratory for Computer Science, MIT, Cambridge MA., 3 pages, May 31-Jun. 1, 2003.

"Conversational Interfaces: Advances and Challenges", Victor W. Zue, et al., Proceedings of the IEEE, vol. 88, 1166-1180, Aug. 2000.

"Jupiter: A Telephone-Based Conversational Interface for Weather Information", Victor Zue, et al., IEEE Transactions on Speech and Audio Processing, vol. XX, No. Y, Jan. 2000, pp. 100-112.

"Partially observable Markov decision processes for spoken dialog systems", Jason D. Williams, et. al., Science Direct, Computer Speech and Lanuage, 21, (Aug. 2006) pp. 393-422.

PCT/FI2009/050729 International Search Report dated Dec. 1, 2009.

Chinese Patent Application No. 200980153496.3 Office Action dated Jul. 27, 2012, along with English language translation.

Russian Patent Application No. 2011121296—Office Action dated Sep. 10, 2012.

Office Action in CN201210574377.9 dated Sep. 3, 2014.

First Office Action in CN201510021388.8 dated Aug. 1, 2017, with English translation.

Communication dated Feb. 28, 2017, with Supplementary Partial European Search Report in EP09823128 dated Feb. 1, 2017.

Communication in EP09823128.5 dated Nov. 14, 2017.

* cited by examiner

METHOD AND SYSTEM FOR PROVIDING A VOICE INTERFACE

FIELD

Example embodiments of the invention generally relate to voice queries. More specifically, example embodiments of the invention relate to a voice based user interface.

BACKGROUND

Increasingly complex features have been implemented on mobile devices, such as mobile phones. Current mobile devices provide access to a variety of information through web interfaces and graphical user interface displays, but the user is typically limited to using a keypad to navigate through a menu hierarchy to select a desired application.

In addition to graphical user interfaces, there have been a number of voice-enabled user interfaces. Short Message Service (SMS) dictation, email dictation, name dialing applications, dialogue driven calendar applications, and music player applications can interactively guide a user through a task. Conventional spoken dialogue systems ask a user a series of fixed questions in a fixed order to narrow a field of possible answers. To find a restaurant, for instance, the system could prompt a user to specify preferences for cuisine, neighborhood, and price range, etc., before providing any answers. This type of interaction fails to address the information seeking needs of users who do not have well-defined preferences, or who may wish to explore the space of possibilities.

Conventional algorithms have also been developed that model dialogue as a Markov Decision Process and optimize the model via reinforcement learning. These algorithms, however, rely on complex and costly training data derived from large numbers of human-machine interactions or simulations of such dialogues.

BRIEF SUMMARY

The following presents a simplified summary of some example embodiments of the present disclosure in order to provide a basic understanding of some example embodiments of the invention. This summary is not an extensive overview, and is not intended to identify key or critical elements or to delineate the scope of the claims. The following summary merely presents some concepts and example embodiments in a simplified form as a prelude to the more detailed description provided below.

Some example embodiments of the present disclosure are directed to an apparatus, method and system for providing a classifier voice interface. More specifically, methods, apparatus, and systems in accordance with some example embodiments of the present disclosure provide for receiving a query, parsing the query to identify an attribute, processing the query to select a first domain-specific voice interface of a plurality of domain-specific voice interfaces based on the attribute, wherein each of the domain-specific voice interfaces comprises specialized information to process queries of different types, and instructing the first domain-specific voice interface to process the query.

Additional example embodiments of the present disclosure are directed to an apparatus, method and system for providing a domain-specific voice interface. More specifically, methods, apparatus, and systems in accordance with some example embodiments of the present disclosure provide for receiving an attribute, applying a scoring function to generate a utility score for each of a plurality of query response templates based on the attribute, selecting at least one of the plurality of query response templates based on the utility scores, and audibly outputting a query response generated from the at least one query response template.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which one or more example embodiments of the invention may be practiced. It is to be understood that other embodiments may be utilized and structural and functional modifications may be made without departing from the scope of the present invention.

Figure 1:
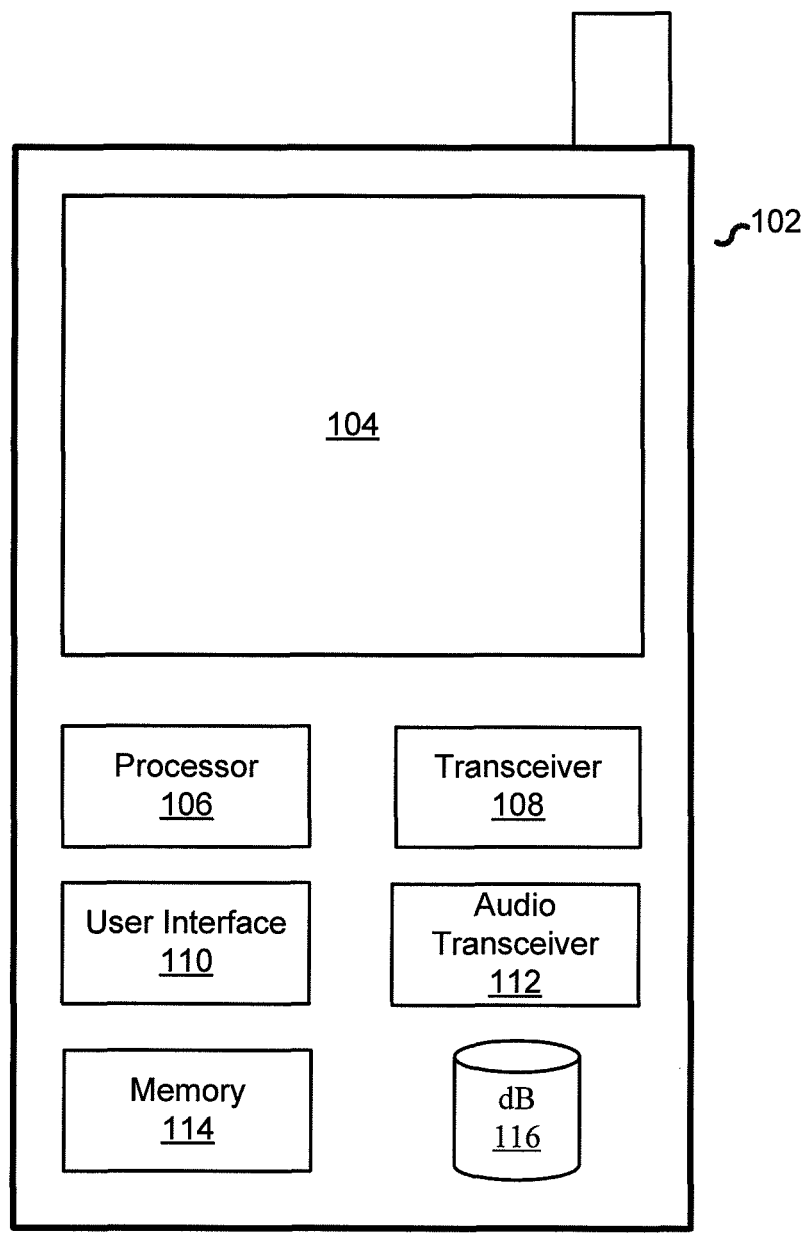
FIG. 1 illustrates a user terminal in accordance with example embodiments of the present disclosure.

FIG. 1 illustrates a user terminal 102 in accordance with example embodiments of the present disclosure. The user terminal 102 may audibly present a voice interface to respond to voice commands from a user. The user may engage in a dialogue with the voice interface to cause the user terminal 102 to perform a task. For instance, the voice interface may receive a query from the user, may process the query to identify one or more appropriate responses corresponding to the query, and may audibly present either a dynamic set of one or more responses or may perform an action. Thus, instead of audibly presenting a fixed series of questions in a fixed order, the voice interface may process the query to identify dynamic query responses that correspond to the query for audible presentation to the user.

In example embodiments, the user terminal 102 may be a mobile communication device, a mobile phone, or a mobile computer, as illustrated, or may also be a digital video recorder (DVR), a set-top box (STB), a server computer, a computer, a hard disc, an Internet browser device, a gaming device, an audio/video player, a digital camera/camcorder, a television, a radio broadcast receiver, a positioning device, a wired or wireless communication device, and/or any combination thereof. The user terminal 102 may be a standalone unit, such as that depicted in FIG. 1, or also may be integrated into another device. For instance, the user terminal 102 may be included in an automobile to provide a voice interface to interact with a user who is driving. The user terminal 102 may be integrated into a dashboard of the automobile, for example, or maybe communicatively coupled via a wired or wireless connection to the automobile.

In the depicted example, the user terminal 102 may include a display 104, a processor 106, a transceiver 108, a user interface 110, an audio transceiver 112, a memory 114 and a metadata database 116. The user interface 110 may include a keypad, touch screen, voice interface, four arrow keys, joy-stick, data glove, mouse, roller ball, touch screen, or other suitable device for receiving input from a user to control the user terminal 102.

The transceiver 108 may permit the user terminal 102 to communicate over a wireless or a wired channel. The audio transceiver 112 may include a speaker for outputting audio to a user and may include a microphone for receiving an audio input from a user.

Computer executable instructions and data used by processor 106 and other components within user terminal 102 may be stored in the memory 114 in order to carry out any of the method steps and functions described herein. The memory 114 may be implemented with any combination of read only memory modules or random access memory modules, optionally including both volatile and nonvolatile memory. Also, some or all of user terminal 102 computer executable instructions may be embodied in hardware or firmware (not shown). For instance, the user terminal 102 may include one or more modules that include hardware, firmware, software executed by the processor 106, and/or any combination thereof.

In an example embodiment, the processor 106 may execute a series of layered software applications to provide a voice interface at the user terminal 102. The series of layered applications may include a classifier voice interface application and one or more domain-specific voice interface applications. The processor 106 may execute the classifier voice interface application to provide a classifier voice interface and may execute the one or more domain-specific voice interface applications to provide respective domain-specific voice interfaces. The series of layered software applications may process a query received at the audio transceiver 112 of the user terminal 102 in the manner described below.

Figure 2:
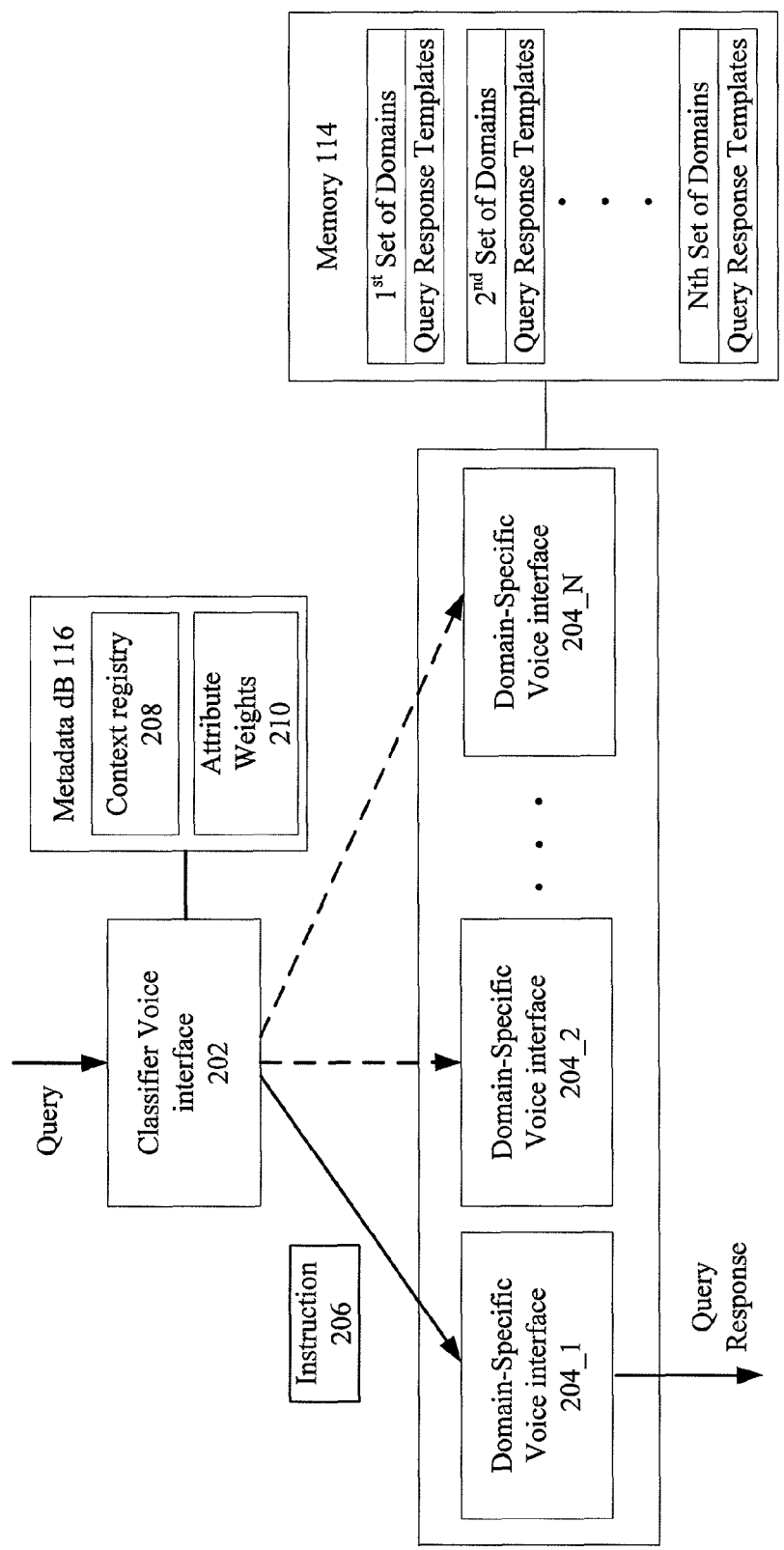
FIG. 2 illustrates an architecture of a series of layered software applications in accordance with example embodiments of the present disclosure.

FIG. 2 illustrates an architecture of a series of layered software applications in accordance with example embodiments of the present disclosure. Initially, a classifier voice interface 202 may receive speech input (e.g., a query) from a user. The classifier voice interface 202 may provide a top level voice interface that is used to select one of multiple domain-specific voice interfaces 204 to process the query. The domain-specific voice interfaces 204 may each have specialized knowledge to perform detailed analysis on queries of a particular type and to carry out in-domain dialogue with the user, whereas the classifier voice interface 202 may provide less detailed analysis and may limit its processing of the query to determining which domain-specific voice interface 204 to invoke to perform detailed analysis of the query.

To select a domain-specific voice interface 204, the classifier voice interface 202 may parse the query to identify attributes of the query. Attributes may be keywords or groups of keywords that may be interpreted as commands by the classifier voice interface 202. The classifier voice interface 202 also may consider context information included in a context registry 208 and attribute weights 210 of the attributes included in the query when assigning the query to a particular domain-specific voice interface 204. Context information may refer to information to provide context to the query. Context information may include the current time and date, user preferences, location, or other information as will be further described below. The attribute weights 210 may be information describing the importance of attributes. The attribute weights 210 may be based on user preferences or other information, as will be further described below. In an example embodiment, the classifier voice interface 202 may interact with the metadata database 116 to obtain the context information and an attribute weight. The classifier voice interface 202 may then select one of the domain-specific voice interfaces 204 to further process query.

Once selected, the classifier voice interface 202 may communicate an instruction 206 to the selected domain-specific voice interface 204. The instruction may include an identifier of the selected domain-specific voice interface 204, the attribute, and the query. In the depicted embodiment, the classifier voice interface 202 may communicate the instruction 206 to domain-specific voice interface 204_1. Dashed arrows in FIG. 1 represent that the classifier voice interface 202 also may communicate instructions to domain-specific voice interfaces 204_2 to 204_when selected.

The selected domain-specific voice interface 204 may receive and process the instruction. The selected domain-specific voice interface 204, as well as the other domain-specific voice interfaces, may be associated with a respective set of domains. The set of domains may be information of a specialized vocabulary or syntax that is unique to the respective domain-specific voice interfaces 204. The respective domain-specific voice interfaces 204 may use the domain information to process the user's query. The domains may be associated with a set of one or more query response templates. The query response templates may be associated with attributes, and the domain-specific voice interfaces 204 may process the attributes received in the instruction 206 to select an appropriate query response template for responding to the query. Selection of a query response template is described in further detail below.

The query response templates may include a template for a query response that is audibly presented to a user in response to the user's query. The domain-specific voice interface 204 may complete a query response template to generate a query response based on information to respond to the user's query, and may instruct the user terminal 102 to audibly output the query response. For instance, the query response template may be "You have [Insert number of meetings] today." If the user asks "How many meetings do I have today?", the domain-specific voice interface 204 may complete the query response template to generate a query response and may instruct the user terminal 102 to audibly output the query response to respond to the user's query. Thus, the classifier voice interface 202 may initially process an initial user query to obtain attributes from the query, identify an appropriate domain-specific voice interface 204 based on the attributes, and dispatch the query to the appropriate domain-specific voice interface 204 for further processing.

For example, the user terminal 102 may include two domain-specific voice interfaces: a calendar domain-specific voice interface and a places domain-specific voice interface. The classifier voice interface 202 may process an audible query received from the user (e.g., "What meetings do I have today") and may determine that the query is a request to find out what meetings the user has. The classifier voice interface 202 may process the query to determine that the calendar domain-specific voice interface would best be able to conduct any further dialogue with the user and to process the query. The classifier voice interface 202 would then forward an instruction to the calendar domain-specific voice interface to further process the query based on its specialized knowledge. The calendar domain-specific voice interface would then generate a query response (e.g., "You have two meetings today").

In another example, the classifier voice interface 202 may direct a user's query to a domain-specific voice interface 204 for music. The user's initial query may be followed by several dialogue turns between the user and the domain-specific voice interface 204 involving filtering and summarization. For instance, if the user asks for blues music, the domain-specific voice interface 204 may filter the user's music for song tracks within the blues genre. Even if the user is not be familiar with features of domain data, the domain-specific voice interface 204 can summarize the features for the user in terms of a small number of features chosen either because they are most useful in partitioning the data, or because they indicate a useful or unusual characteristic of the data. For example, the domain-specific voice interface 204 may process and filter the user's music and audible output "Ten of these blues tracks are on your recently-played list." The domain-specific voice interface 204 can also be responsible for handling in-domain actions, such as, but not limited to, playing certain songs, creating a new playlist, etc. Further details of classifying a query at the classifier voice interface 202 and processing of the query by a domain-specific voice interface 204 are provided below.

Each of the domain-specific voice interfaces 204 may be associated with a set of one or more domains. A domain may refer to a set of features (e.g., people, places and media subsets in a user terminal). The domains may be organized as a knowledge base having a hierarchical structure.

Figure 3:
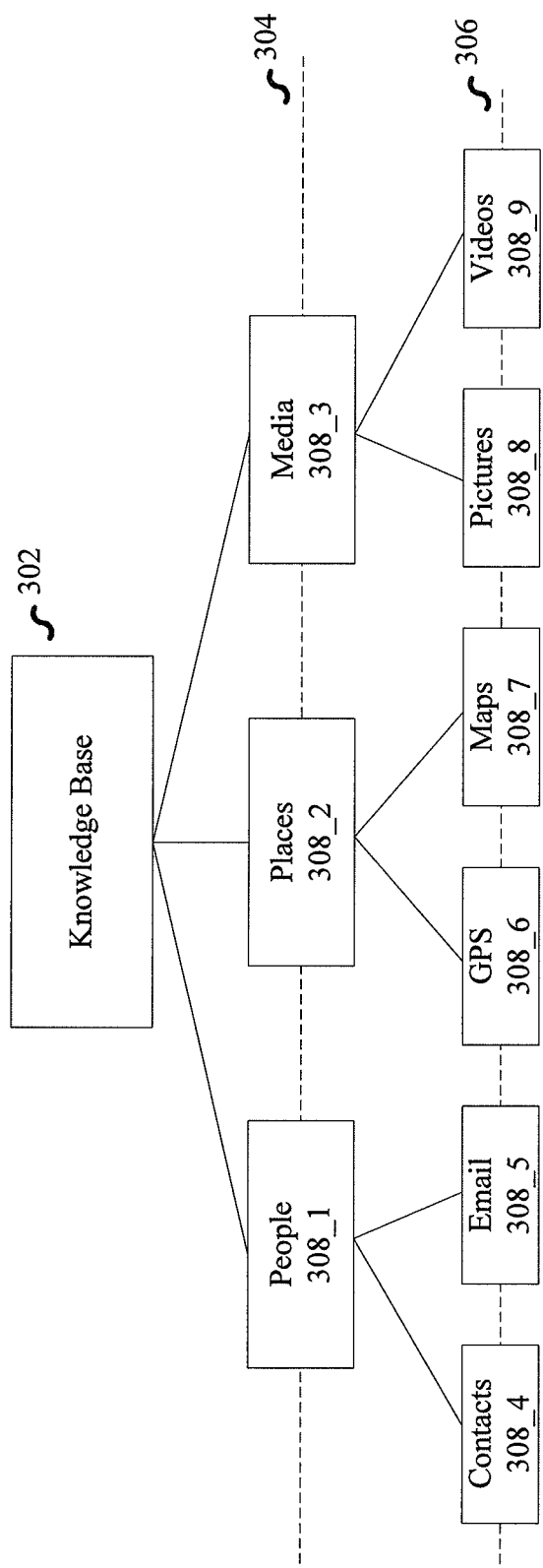
FIG. 3 illustrates a knowledge base in accordance with example embodiments of the present disclosure.

FIG. 3 illustrates a knowledge base in accordance with example embodiments of the present disclosure. In an example embodiment, the knowledge base 302 may have a hierarchical structure with one or more levels of domains. For example, a first level 304 may include a people domain 308_1, a places domain 308_2, and a media domain 308_3. Each of the domains on the first level 304 may be associated with different domain-specific voice interface 204. For instance, the people domain 308_1 may be associated with a people domain-specific voice interface 204, the places domain 308_2 may be associated with a places domain-specific voice interface 204, and the media domain 308_3 may be associated with a media domain-specific voice interface 204.

The first level 304 may include further sublevel domains, such as domains occurring at the second level 306 of the knowledge base hierarchy. For instance, the people domain 308_1 may include a contacts domain 308_4 and an e-mail domain 308_5 on the second level 306, as well as a Short Message Service (SMS) domain, a Multimedia Messaging Service (MMS) domain, a calendar domain (not shown). The places domain 308_2 may include a GPS positioning domain 308_6 and a maps domain 308_7 on the second level 306, as well as a maps domain, a points of interest domain, a business directory domain, and a navigation capabilities domain (not shown). The media domain 308_3 may include a pictures domain 308_8 and a videos domain 308_9 on the second level 306, as well as a music domain and a podcasts domain (not shown).

The people domain-specific voice interface 204 may process queries corresponding to the people domain 308_1, the contacts domain 308_4, the e-mail domain 308_5, as well as any further lower level domains (not shown). Similarly, the places domain-specific voice interface may process queries corresponding to the places domain 308_2, the GPS domain 308_6 the maps domain 308_7, as well as any further lower level domains (not shown). The hierarchy of the knowledge base 302 is an example, and a hierarchy having more or fewer levels, as well as levels having more, fewer, or other domains than shown in FIG. 3 may also be used. Processing by the domain-specific voice interfaces 204 is described in further detail below.

Figure 4:
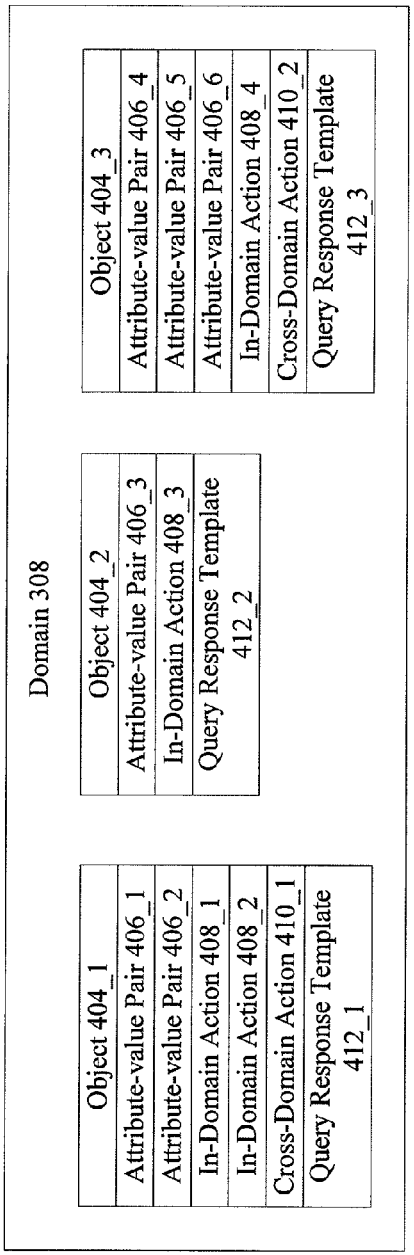
FIG. 4 illustrates a domain in accordance with example embodiments of the present disclosure.

FIG. 4 illustrates a domain 308 in accordance with example embodiments of the present disclosure. The domain 308 may include one or more objects 404. In the depicted example, the domain 308 may include objects 404_1 to 404_3. Generally, an object 404 may be an instance of the class category. For example, each object within an Email domain may represent a specific Email message. The objects 404 may include one or more attribute-value pairs 406, one or more in-domain actions 408, and a query response template 412, and optionally may include one or more cross-domain actions 410. Examples of objects 404 may be a contact item, a calendar entry, a tagged location on a map, a picture taken by the user, etc. An example of attribute-value pairs 406 describing an object 404 of a contact item may be: "First name: John, Last Name: Smith," where "First name" is an attribute and "John" is a value. An example of attribute-value pairs 406 describing an object 404 of a calendar item may be "Title: review meeting," "Date: Jun. 29, 2008," "Time: 13:00-14:00, EST." Examples of in-domain actions 408 describing an object 404 of a contact item may include: Action 1) call contact; Action 2) send Short Message Service (SMS) message to contact; Action 3) send Multimedia Messaging Service (MMS) message to contact; Action 4) received SMS from contact, Action 4) received MMS from contact. Other in-domain actions associated with an item also may be defined. Examples of cross-domain actions 410 may be: Action 1) contacts domain: navigate to address in the places domain; Action 2) media domain: send videoclip via email to address in the people domain; Action 3) show geographical position where picture was taken in the places domain. Other cross-domain actions also may be used. The query response templates 412 may include a template for a query response that is audibly presented to a user in response to the user's query. Each of the classifier voice interface 202 and the domain-specific voice interfaces 204 may be associated with particular vocabulary that provides their respective knowledge to identify a particular object 404 in a domain 308.

Figure 5:
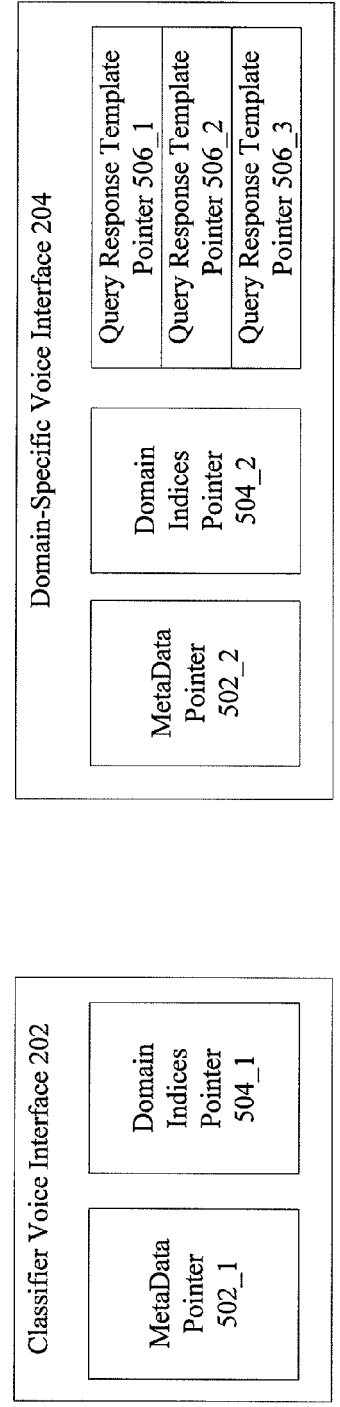
FIG. 5 illustrates a classifier voice interface and a domain-specific voice interface in accordance with example embodiments of the present disclosure.

FIG. 5 illustrates a classifier voice interface 202 and a domain-specific voice interface 204 having a particular vocabulary in accordance with example embodiments of the present disclosure. The particular vocabulary may be metadata, domain indices, and query response templates. The classifier voice interface 202 may include a metadata pointer 502_1 pointing to its metadata in the metadata database 116 and a domain indices pointer 504_1 pointing to its domain indices in the memory 114. The domain-specific voice interface 204 may include a metadata pointer 502_2 pointing to its metadata in the metadata database 116 and a domain indices pointer 504_2 pointing to its domain indices in the memory 114. The domain-specific voice interface 204 also may include one or more query response template pointers 506 pointing to its query response templates 412 in the memory 114.

For example, a people domain-specific voice interface 204 may be associated with metadata, domain indices, and query response templates for processing user queries corresponding to information about people, whereas a places domain-specific voice interface 204 may be associated with metadata, domain indices, and query response templates for processing user queries that correspond to information about places. Metadata may refer to the descriptive attributes of an object. The metadata for a music track, for example, may include the name of the track, the album name, the artist, composer, etc. Domain indices may be attributes that are relevant to a specific domain. For contact information, name and phone number may be domain indices. For an email, name, subject, and timestamp are examples of domain indices. The above noted domain indices are not an exhaustive list, and each domain index might not be unique to a specific domain. The query response templates 412 may be a set of templates for query responses that may be populated with information to answer the user's query, and the user terminal 102 may audibly output a query response based on a completed query template.

The classifier voice interface 202 and the domain-specific voice interfaces 204 may be data configurable. The metadata, domain indices, and query response templates can be updated to extend or revise one or both of their vocabularies and language models. A vocabulary may be a list of words and their respective pronunciations the classifier voice interface 202 and the domain-specific voice interfaces 204 are able to process. For example, if a new entry "John Smith" appears in a contact list, the vocabulary classifier voice interface 202 and the domain-specific voice interfaces 204 of the corresponding domain-specific voice interface 204 may be extended by "John" and "Smith" if those words were not already part of the vocabulary. A language model can describe how words follow each other in a particular language and can provide a means for the classifier voice interface 202 and the domain-specific voice interfaces 204 to distinguish between likely and unlikely word sequences to improve word recognition accuracy. For example, the word sequence "after eating my" is likely to be followed by words like "lunch", "breakfast" or "sandwich", while "hat", "laptop" or "stock-market" are rather unlikely. A language model may capture word sequence likelihood information in a statistical model that is trained on large text corpora. Language models can also be adapted to the speaking style of a user and the types of sentences the domain-specific voice interfaces 204 expects to receive in a given domain.

The domain-specific voice interface 204 can be built at least in a semi-automatic manner by using the structured object-based representation in the knowledge base 302 for performing in-domain actions 408 and cross-domain actions 410 and re-usable query response templates 412, as will be discussed later in detail. The respective vocabularies of the classifier voice interface 202 and the domain-specific voice interfaces 204 may be collected and indexed to provide the knowledge base 302, as discussed below.

Figure 6:
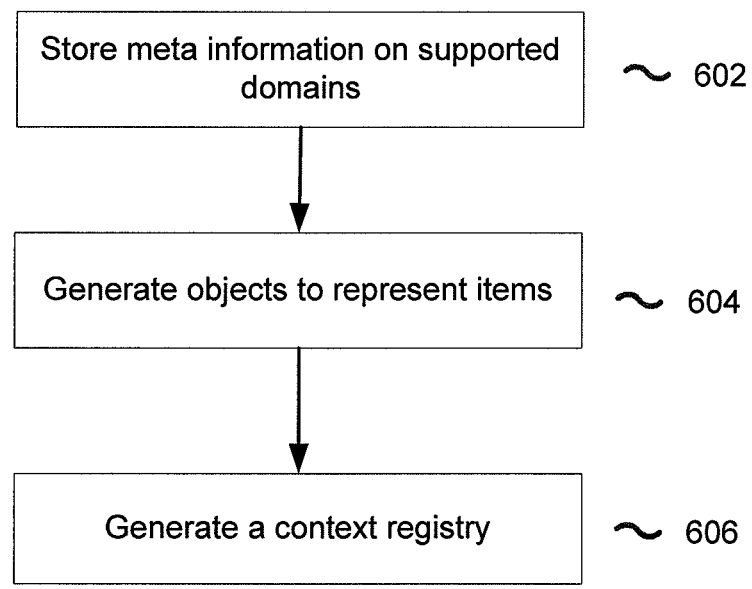
FIG. 6 illustrates a method for collecting and indexing metadata to generate a knowledge base in accordance with example embodiments of the present disclosure.

FIG. 6 illustrates a method for collecting and indexing metadata to generate a knowledge base in accordance with example embodiments of the present disclosure.

In block 602, the user terminal 102 may store metadata in the metadata database 116 on supported domains 308 of the knowledge base 302. The metadata database 116 may store metadata from all supported domains 402. The user terminal 102 may collect, index for search, and store the metadata in the metadata database 116. The classifier voice interface 202 and the domain-specific voice interface 204 may have access to the metadata database 116. The classifier voice interface 202 and the domain-specific voice interface 204 may access the metadata database 116 to personalize each to provide a consistent audible presentation regardless of which voice interface is being used. Within each domain, different metadata may be relevant. The user terminal 102 can process user preferences, either specified through explicit actions on the part of the user, or learned over time, to summarize the data within the user's preferred categories. For example, one user may prefer to organize music by albums, whereas another may purchase individual songs and organize music by artist.

In block 604, the user terminal 102 may generate objects to represent items of the domains. An object can be defined by one or more attribute-value pairs 406 describing the object 308, one or more in-domain actions 408 defined in the domain 308, one or more cross-domain actions 410 that are permitted across domains, and/or any combination thereof. The user terminal 102 may index and store attributes-value pairs 406 of the objects 404 for each of the domains 308 in the metadata database 116.

In block 606, the user terminal 102 may generate a context registry. The context registry may contain context information to identify certain current events and user preferences to provide context to the user's query. The context information may include user preferences, detected events, changes in user interaction behavior, and/or any combination thereof. The context information in the context registry can be updated manually by the user (e.g., setting preferences), by the user terminal 102 based on automatic detection of events (e.g., meeting start time passed, high physical activity detected by accelerometers suggesting user is in motion, etc.), or by automatic detection of changes in interaction behavior from the user (e.g., longer delays in response, repeated need for error correction during dialogue, etc.).

The context registry 208 may be used to personalize the voice interfaces to the user. The classifier voice interface 202 and the domain-specific voice interface 204 may present dialogue to the user based on summarization techniques. Statistical techniques may be used to discover which metadata categories are best suited for clustering the data into logical subsets that may help the user focus on the right set of data. For example, a property value that divides most of the data into a small number of clusters, or a property value that is unusual may be two techniques that provide useful summaries. For example, "Most of your new email is from your department, and three are marked urgent." Depending on user preferences, the same domain-specific voice interface 204 may behave differently for different users.

In an example embodiment, the classifier voice interface 202 and the domain-specific voice interface 204 can obtain context information from the object-based representation and can store the context information in the context registry 208. Context information can be the results of various sensors and software daemons that constantly are monitoring the state of the user terminal 102. Examples of context information may include GPS location, profile (silent, outdoor, meeting), or user activity (driving, walking). Storing the context information in the context registry 208 permits different domain-specific voice interface 204 to modify the audio output presented to the user based on a user's desired presentation format or input preferences. For example, if a meeting is scheduled for a given time and the system detects very little motion of a user terminal 102 including a motion detecting device, such as, but not limited to, a built-in accelerometer, the domain-specific voice interface 204 can automatically modify the output representation preference to be graphical as opposed to speech output. The domain-specific voice interface 204 may generate an output object that represents information for the user. The output form can be determined algorithmically by examining user preferences and context information to determine the preferred representation from a set of multimodal options. The flow diagram of FIG. 6 may then end.

The classifier voice interface 202 may use the one or more attribute-value pairs 406 describing the object 404, the one or more in-domain actions 408 defined in the domain 308 to which the object 404 belongs, the one or more cross-domain actions 410 that are permitted across domains for a given object 404, and the context information, to classify speech queries received from the user.

Figure 7:
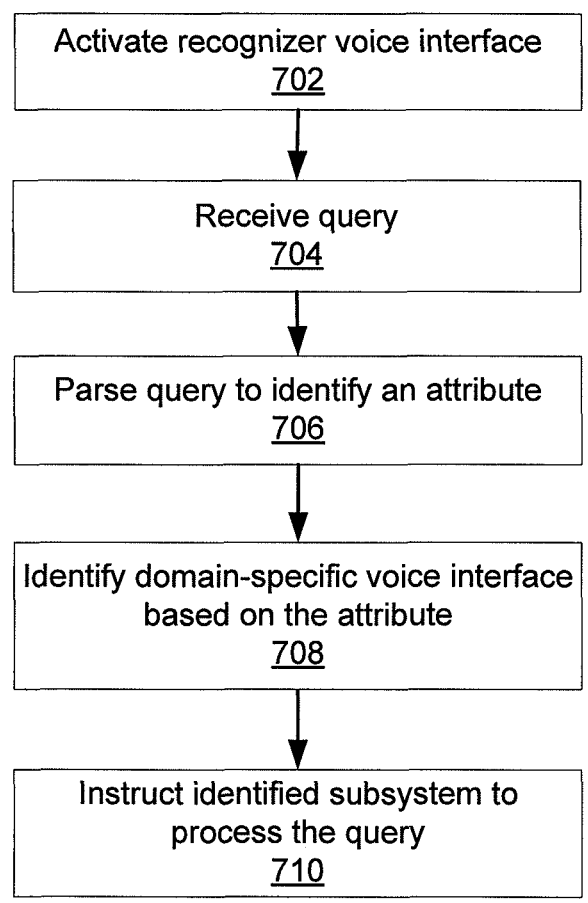
FIG. 7 illustrates a method for processing a user query to select a domain-specific voice interface for processing the query in accordance with example embodiments of the present disclosure.

FIG. 7 illustrates a method for processing a user query to select a domain-specific voice interface 204 for processing the query in accordance with example embodiments of the present disclosure.

In block 702, the user terminal 102 may receive a speech input from a user to activate a classifier voice interface 202. In an example embodiment, the user may assign the classifier voice interface 202 an identity (e.g., the user may assign "N95" as the identity). The user may speak the identity for voice activation of the classifier voice interface 202. The identity may be a word or phase assigned to the classifier voice interface 202 by the user. Also, the classifier voice interface 202 may have a default identity if the user has not assigned the classifier voice interface 202 an identity. The identity permits the user to invoke the classifier voice interface 202 by a single utterance and does not require the classifier voice interface 202 to prompt the user to provide a query, but the classifier voice interface 202 may prompt the user for a query if desired. Also, the classifier voice interface 202 may be activated by the user pressing a bottom or providing other input. The classifier voice interface 202 additionally may continuously operate and may process audio to determine if a query from a user has been received. Advantageously, when only certain applications are voice enabled, the classifier voice interface 202 can also inform the user that a requested voice activated feature is not available.

The classifier voice interface 202 can activate domain-specific voice interfaces 204 to permit the user to utilize domain-specific voice interface 204 without having to remember an identity of each of the domain-specific voice interface 204 (e.g., a user would not have to say "email" or "calendar" for respective applications). The classifier voice interface 202 does not require its user to understand how it is implemented or configured. Additionally, a user may speak the identity that he chooses for the classifier voice interface 202 and may give simple commands or requests to obtain desired results.

In block 704, the classifier voice interface 202 of the user terminal 102 may receive a query from the user via the audio transceiver 112. The classifier voice interface 202 may process the query to identify which domain-specific voice interface 204 (e.g., email domain-specific voice interface, calendar domain-specific voice interface, music player domain-specific voice interface, weather domain-specific voice interface, maps domain-specific voice interface, traffic domain-specific voice interface, etc.) is best suited to handle the query. The classifier voice interface 202 may use rules or machine-learning techniques to identify cues from the user query for dispatching the query to the appropriate domain-specific voice interface 204. For example, by collecting a set of example queries that cover all the relevant domains, certain words and phrases may be more closely associated with one domain rather than another. These characteristic words and phrases serve as cues for those domains. This correspondence can either be determined automatically by studying the statistical correlations (e.g., machine learning) or by relying on a knowledge engineer to determine which cues best represent each domain. The classifier voice interface 202 may delegate processing of a query to a domain-specific voice interface 204 having a more appropriate domain knowledge in terms of vocabulary and command syntax to provide meaningful query responses in a way that seems natural through an audible dialogue between the user, the classifier voice interface 202, and the one or more domain-specific voice interfaces 204.

In block 706, the classifier voice interface 202 may parse the query to identify an attribute. The classifier voice interface 202 may parse the query to identify information (e.g., words in the query). Depending on the domain, the presence of a single cue or set of cues may be sufficient to determine the domain. In other cases, a more detailed grammar can be used to see if the query includes the words in the right sequence to indicate the properties and values associated with a domain.

In block 708, the classifier voice interface 202 may identify a domain-specific voice interface 204 based on the attribute. To identify the domain-specific voice interface 204 based on the attribute, the classifier voice interface 202 may use one or more of a keyword spotting approach, a natural language understanding approach, a hybrid approach, and a scoring approach to compare the different domain-specific voice interface 204.

In the keyword spotting approach, the classifier voice interface 202 may process the user's query to identify one or more keywords. For instance, each of the domain-specific voice interface 204 may be associated with a unique set of words. If the user has spoken one or more of these words, the classifier voice interface 202 may determine that the user is invoking the associated domain-specific voice interface 204. For example, in the request, "Is there any new email?", the classifier voice interface 202 may identify the term email as the keyword to invoke an Email domain-specific voice interface. Other keywords may also be indicators for the same domain. In the request, "Read me the latest message from Joe", the classifier voice interface 202 may identify the term message as the keyword to invoke an Email domain-specific voice interface.

In the natural language understanding approach, the classifier voice interface 202 may apply domain knowledge, grammar, statistical models, and the user's own data (e.g., contact list of names) to develop a more complete interpretation of the query. For example, the classifier voice interface 202 may generate a "frame" (e.g., a computer model) of the user's intent based on the query. The classifier voice interface 202 may fill in the frame with possible details such as location, specific names from a contact list, time, date, and the user's requested action. The frame then may be used determine the appropriate domain-specific voice interface 204. The frame may be an object that includes the attributes and values to capture the user's intentions. The frame may be a distilled representation of what was understood from the provided speech input. For example, the classifier voice interface 202 may identify a grammar of <calendar-specific verb> <filler> <calendar-specific noun> <filler> in a speech input (e.g., "Reschedule my next meeting with Joe to next week") to identify a calendar domain. In an example using statistical models, the term "message" may refer either to SMS messages or email, but for a particular user who never sends SMS messages, a statistical model can bias toward the selection of the email domain. In an example of processing user data, the user data can include user preferences (e.g., in the restaurant domain, the relative importance a user places on food quality, service, price, etc.) as well as interaction history (e.g., in an email domain, to determine what messages are important, actionable, etc.).

In the hybrid approach, the classifier voice interface 202 may make an initial selection of one of the domain-specific voice interface 204 to further process the query, and the classifier voice interface 202 may instruct the identified domain-specific voice interface 204 to re-interpret the user's query with its more detailed domain knowledge to confirm its selection. For instance, the classifier voice interface 202 may use the keyword spotting approach or the natural language understanding approach to initially select a domain-specific voice interface 204, and may then forward an instruction to the selected domain-specific voice interface 204 to process the query. The domain-specific voice interface 204 may confirm the appropriateness of its selection by the classifier voice interface 202, or may determine that the selection may not be appropriate, and may request that the classifier voice interface 202 select a different domain-specific voice interface 204 to process the query. For example, using word spotting, some terms may be ambiguous, and a more detailed parse of the request may indicate that the wrong choice was made. The term message, might mean an SMS message or could mean an email message. If the classifier voice interface 202 assumes an SMS message and the user provides an email-style address for the destination, then an SMS domain-specific voice interface 204 may recognize the mismatch and may request that the classifier voice interface 202 select a different domain-specific voice interface 204 to process the query. Also, the SMS domain-specific voice interface 204 may suggest the appropriate domain.

In the scoring approach, the classifier voice interface 202 may instruct all of the domain-specific voice interfaces 204 to process the query, and may select the one that has the best interpretation of the query (e.g., highest score on some normalized scale). For some domains, the specialized grammars and vocabularies the domain-specific voice interfaces 204 may not be able to interpret the query and may return a low score. This approach may also be useful in identifying the language of the query. The utterance can be presented to say an English and Mandarin system, and only the appropriate domain-specific voice interface 204 may understand the request. This approach can be used with a remotely hosted user terminal 102 communicatively coupled via a network to a server that performs the processing of the respective domain-specific voice interface 204 or may be implemented entirely at the user terminal 102. The classifier voice interface 202 can identify the appropriate domain-specific voice interface 204 based on identifying attributes and their corresponding values of the query using one of the above approaches.

In block 710, the classifier voice interface 202 of the user terminal 102 may instruct the identified domain-specific voice interface 204 to process the query. In an example embodiment, the classifier voice interface 202 may forward an instruction instructing the identified domain-specific voice interface 204 to process the query. The instruction may include one or more attribute-value pairs 406 parsed from information included in the query. For instance, a user may query "What meetings do I have today?" The classifier voice interface 202 may parse the query to identify a time period attribute and may include a value of "today" to indicate the time period of interest to the user. The classifier voice interface 202 may forward the attribute-value pair of {period: today} in the instruction to the domain-specific voice interface 204. The flow diagram of FIG. 7 may then end.

When processing the query, the selected domain-specific voice interface 204 may use a scoring function to arrive at one or more optimal responses at each dialogue turn. To perform the scoring, the domain-specific voice interface 204 may process the one or more attribute-value pairs received in the instruction from the classifier voice interface 202. The domain-specific voice interface 204 also may personalize processing of the query based on the user location, dialogue context, information theoretic metrics applied to domain data, and user model information. For example, location information can be used to adjust to the appropriate time zone for calendar entries and dialogue context can be used to "remember" results from earlier steps in the dialogue (e.g., if the had already asked about meetings on Monday, then a meeting time without specifying a new date would still refer to Monday). Information theoretic metrics may refer to statistical analysis of a set of data that has been narrowed through dialogue. Information theoretic metrics can allow the data to be summarized in a meaningful way; and user modeling can be used to learn and apply user preference information to either filter data or order data to meet user's preferences. For example, if a user prefers to learn about mail from his project team before personal mail, then that user preference can influence the order that information is presented. The domain-specific voice interface 204 may use the information-theoretic metrics to determine the best query response to help the user narrow down the choices most efficiently based on the context of the query.

The domain-specific voice interface 204 may treat each possible query response as a response option, and may assign a numerical value to each response option by computing a weighted scoring function using Multi-Attribute Utility Theory. Multi-Attribute Utility Theory (MAUT) can provide a straight forward way to operationalize the use of ranked user preferences to tailor information to a specific user. MAUT can be used to determine that a user's overall preferences are determined by the interplay of multiple individual factors. Each domain-specific voice interface 204 may have a set of one or more possible response options that have query response templates 412 with one or more attributes corresponding to a particular domain 308. For example, the calendar domain-specific voice interface 204 may be associated with a number of query response templates pointers 506 pointing to query response templates 412 of a maps domain 306_4 stored in memory 114. An example of a query response template 412 may be "You have a meeting at [Insert time] with [Insert meeting attendee]," where the domain-specific voice interface 204 would fill in the bracketed text with the appropriate information to generate a query response that responds to the user's query. Each of the query templates 412 may include one or more attributes. Examples of attributes include time period, name, location, etc.

The domain-specific voice interface 204 may apply Multi-Attribute Utility Theory to determine weights to assign to each attribute as the interplay of different attributes between the various response options may affect which query response template is the optimal choice for responding to the query. Weights of attributes may be determined by ranking the importance of attributes, as described below in further detail. The domain-specific voice interface 204 may linearly combine the weights to arrive at a utility score for each query response template. As such, the domain-specific voice interface 204 may treat possible query response as an optimization problem for both content selection and information presentation, where the optimal query response can be computed at each dialogue turn.

Rankings for particular attributes can be induced from information gathered during user interactions with the user terminal 102 or can be explicitly elicited from users. Rankings can be converted to weights w using the following equation (from Multi-Attribute Utility Theory):

$$w_k = \frac{1}{k}\sum_{i=k}^{K}\frac{1}{i}$$

where K equals the number of attributes in the ranking. The weights from the user model and scalar values associated with attribute values are combined using a simple additive function, to yield an overall utility U for an entity indexed by h:

$$U_h = \sum_{k=1}^{K} w_k u_k(x_{hk}).$$

The attributes that have the highest utility score by this metric are the ones that match most closely user preferences.

Weights for attributes can be based on user preferences. Objective data that these weights apply can come from database fields or consumer-generated data where attributes and associated values are obtained from reviews. In cases where preferences can be inferred or elicited using a user model, the domain-specific voice interface 204 may rank attributes based on those preferences. Scoring based on the user model can proceed as outlined above. User preferences may be, for instance, based on a user's affinity for different types of music, the user's preference for more or less verbose communication from the domain-specific voice interface 204, which may depend on the user's familiarity with the domain-specific voice interface 204, or other factors. Weights can be obtained via the MAUT function outlined above.

In other cases, the domain-specific voice interface 204 may use objective measures based on the context of the query to assign weights to attributes. For instance, the domain-specific voice interface 204 may consider a physical distance in cases where location is an attribute (i.e., presenting information to the user depending on where she is and what activity she is engaged in) or a dialogue cost in cases where options have ramifications within the domain-specific voice interface 204, such as erasing stored context. Physical distance can be used as a weight. For example, the domain-specific voice interface 204 may multiply a score for a particular restaurant by $$\frac{1}{d}$$

where d is the distance from the user to the restaurant. This will have the effect of causing restaurants that are farther away from the user to score lower. In some cases, specific responses have a cost in the overall dialogue, e.g., by causing context to be lost as a new dialogue path is followed. If such a response in given, the user may have to reintroduce all previously specified constraints in order to return to the desired context. In cases such as these, a cost can be associated with choosing a particular response that reflects the number of attributes that may be forgotten, and a confirmation sub-dialogue may be invoked before accepting such a response. Furthermore, new attributes discovered via automatic processing of consumer-generated media can be seamlessly added to the metadata database 116 with default weights that can be modified as users interact with the domain-specific voice interface 204 and use the new attributes. Default weights may be modified over time as more information is gathered about a user's changing dispositional preferences.

As such, the weights assigned to the attributes can be personalized in terms of query context, user preferences, and user owned data (e.g., music). Personalization thus permits the voice interfaces to handle changing data content (e.g., user's music repository, email inbox, or pictures/videos taken) of the respective domains 402.

Figure 8:
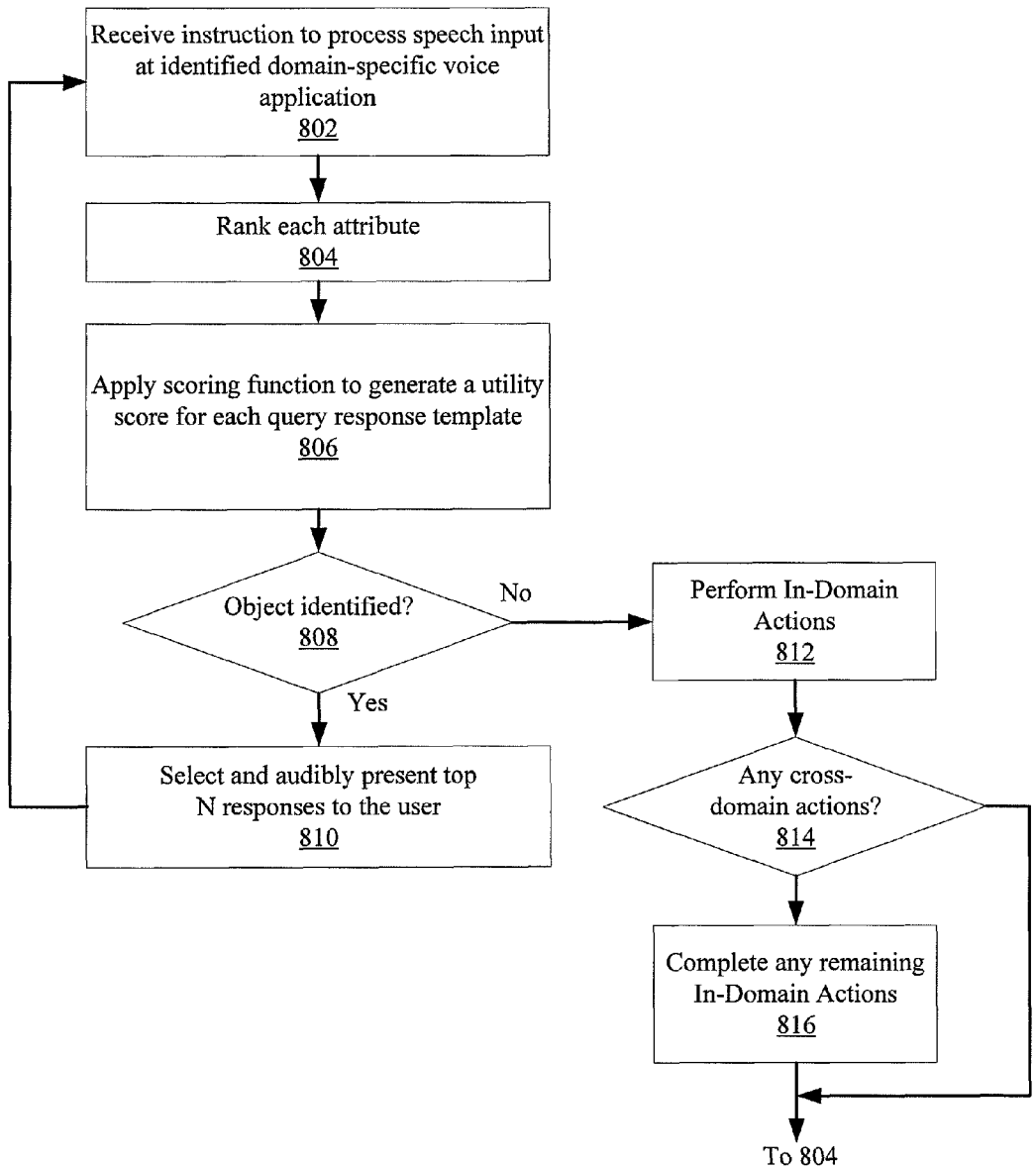
FIG. 8 illustrates a method for processing a query at an identified domain-specific voice interface in accordance with example embodiments of the present disclosure.

FIG. 8 illustrates a method for processing a query at an identified domain-specific voice interface 204 in accordance with example embodiments of the present disclosure.

In block 802, a domain-specific voice interface 204 of the user terminal 102 may receive an instruction from the classifier voice interface 202 to process the speech input. The instruction may include one or more attribute-value pairs 406. For instance, the user may provide a speech input that is a query "How many meetings do I have today?", where the classifier voice interface 202 may have parsed the query to generate an instruction including the attribute-value pair of "period: today." The domain-specific voice interface 204 can receive the attribute-value pair, along with any other attribute-value pairs previously introduced in context that remain applicable. The domain-specific voice interface 204 also may identify and process additional attribute-value constraints based on further speech input provided by the user.

In block 804, the domain-specific voice interface 204 may rank each attribute-value pair. To rank the attribute-value pairs 406, the domain-specific voice interface 204 may retrieve context information from the context registry 208 of the metadata database 116. For example, a user of a restaurant domain-specific voice interface 204 may have a preference for food quality (e.g., good), service (e.g., good), price (e.g., inexpensive), cuisine (e.g., a specific set of cuisines), location (e.g., a specific set of neighborhoods), and décor (e.g., good), in that order. The MAUT formula may return weights of 0.41 (food quality), 0.24 (service), 0.16 (price), 0.10 (cuisine), 0.06 (location), and 0.03 (décor). Values for attributes such as food quality may be assigned a scalar representation (e.g., "excellent"=5; "very good"=4, etc.). The weights multiplied by the scalar values for the attributes and summed across all attributes mentioned would constitute a utility score for a particular response. The response could contain a single restaurant, in which case the score reflects the utility of the restaurant itself, or it could mention clusters of restaurants ("Many restaurants in Back Bay have excellent food quality and very good service"), in which case the utility of the response would be determined by the attributes, values, and weights specifically mentioned.

The context information may be, for example, user preferences for each of the attribute-value pairs 406 included in the instruction indicating that the user has identified certain attributes as being more important than others. The domain-specific voice interface 204 may rank each attribute based on the context information. Contextual information such as location or proximity may also be used to score a particular response. In the case of location on a coarse level (e.g., neighborhood), context could be scored as described above. For proximity, an inverse weighting could be assigned to favor entities that are closer in distance.

The domain-specific voice interface 204 optionally may apply machine learning techniques to discover associations among attributes. Decision tree induction can be used to determine these associations. In addition to being lightweight and easy to compute, decision trees may also be relatively easy to convert to natural language representations.

In block 806, the domain-specific voice interface 204 may apply a scoring function to score each attribute-value pair 406 and sum across all attribute-value pairs 406 to obtain a utility score for each query response template 412. The domain-specific voice interface 204 may retrieve the query response templates 412 of its domain 308 from the memory 114 that have at least one of the attributes identified in the instruction from the classifier voice interface 202. For each query response template 412, the domain-specific voice interface 204 may score each attribute-value pair 406 and sum across all attribute-value pairs 406 in the query response template 412 to obtain a utility score, as described above, for the query response template 412.

Applying a scoring function to each query response template 412 may permit the domain-specific voice interface 204 to compute a statistical profile of all possible query responses based on the context information. Using the statistical profile, the domain-specific voice interface 204 can explore a range of possible query response types. Although it may be possible to determine which responses most closely match a particular user profile, the domain-specific voice interface 204 might also identify other responses that may not have scored as highly, but have interesting tradeoffs within specific attributes as further discussed below.

Based on the statistical profile, the domain-specific voice interface 204 may select only a small set of optimal query responses known to conform to user/general preferences. The size, type, and modality of the output device (e.g., display 104, audio transceiver 112, etc.) of the user terminal 102 may determine how many choices to present to the user. The user terminal 102 may show more choices if the display 104 is large. Maps may influence how information is presented, as well. Fewer choices may be chosen with a speech-only interface where all responses must audibly presented to the user.

The domain-specific voice interface 204 also may select both optimal query responses and interesting outliers, representing trade-offs that the user may be interested in pursuing among various attribute values. A user who is concerned about good food quality, good service, location, and price, in that order, can specify a series of constraints that results in the retrieval of a set of restaurants ranked highly for quality and service, while also being relatively expensive. Since this user's two most highly desired features are food quality and service, price can contribute a relatively small portion to the overall determination of sets of restaurants to display. However, if one set of restaurants is an outlier among the others, in that all members have good quality and service and are very inexpensive, that set might also be chosen to show to a user.

Also, the domain-specific voice interface 204 may present the full range of response options (e.g., in the case of graphical user interface output) in an order that helps the user make sense of the large amount of data to enable the user to explore the range of possibilities. Responses can be ordered by utility score, based on preferences, etc.

In block 808, the domain-specific voice interface 204 may determine whether the utility score corresponds to a single object. For instance, the utility score may be associated with sending an email to a particular contact. In cases where users request a specific action, the domain-specific voice interface 204 can perform that action, if it has enough information to do so. Where the domain-specific voice interface 204 has determined that it needs more information, the domain-specific voice interface 204 can query the user (e.g., for a recipient for an email message, or perhaps a subject header). If a single object is identified, the flow diagram may continue to block 812. If multiple objects or no objects are identified, the flow diagram may continue to block 810.

In block 810, the domain-specific voice interface 204 may select the top N query response templates 412 for presentation to user, where "N" corresponds to an integer. The top N query response templates 412 may be used to prompt the user for further information. The domain-specific voice interface 204 may audibly present one or more query responses generated from the respective query response templates 412 to prompt the user to provide information to direct the user to narrower or broader domains within the hierarchy of the knowledge base 302. For instance, referring again to FIG. 2, the people domain 308_1 in the first level 304 may have the contacts domain 308_4 and the email domain 308_5 as lower level (i.e., more specific) domains. The top N query responses may relate to the domain-specific voice interface 204 prompting the user to provide more information to determine one or more actions a user desires to take in the contacts domains 308_4.

To determine the top N query responses, the domain-specific voice interface 204 may have a response threshold and may select the top N query responses having a utility score greater than the response threshold. The domain-specific voice interface 204 may then audibly generate the top N query responses based on the query response templates 412 and may prompt the user to respond with a speech input that provides a further constraint. For instance, the user terminal 102 may output an audible description of narrower or broader domains and may ask the user to speak a further constraint. For example, in order to send a text message, the domain-specific voice interface 204 may prompt the user until at least one unambiguously specified recipient has been identified. If the user has simply specified "John" and there are multiple entries in the user's contacts list with the given name "John", the domain-specific voice interface 204 may prompt the user for clarification. The flow diagram may return to block 802 to process the speech input that provides the further constraint. Returning to block 808, if an action is identified, the flow diagram may continue to block 812.

In block 812, the domain-specific voice interface 204 may perform in-domain actions 408 associated with the identified object 404. In-domain actions may be performed when requested by a user. As discussed above, an object 404 may be associated with one or more in-domain actions 408. If a user makes a request to send a message, the domain-specific voice interface 204 can invoke a message-sending application. If it is clear from context that the user means SMS (as opposed to email), and a recipient is clear, the domain-specific voice interface 204 can then move on to filling in the message. If either the type of message or the recipient is unclear, the domain-specific voice interface 204 can ask for clarification.

In block 814, the domain-specific voice interface 204 may determine whether there are any cross-domain actions 410 associated with the identified object 404. Each domain-specific voice interface 204 can identify actions in other domains, so that a user utterance that invokes an action in another domain can be handled appropriately. If there are not any cross-domain actions 410, the flow diagram may continue return to block 704 when all of the in-domain actions 408 have completed to permit the classifier voice interface 202 to process a further query from the user as described in FIG. 7.

If there are cross domain actions 410 associated with the object 404, the domain-specific voice interface 204 may hand over processing of the query to the new domain-specific voice interface 204 with an instruction to perform the cross-domain action 410. If a cross-domain action is detected, the domain-specific voice interface 204 may hand over a meaning representation of the current utterance, along with the entire discourse history to the new domain-specific voice interface 204.

During processing, the new domain-specific voice interface 204 can apply the context information contained in the context registry 208 to personalize the dialogue with the user. The user preferences for verbosity and the use of graphical/voice modality can be propagated across the different domain-specific voice interface 204 when passing dialogues to another domain-specific voice interface 204 for carrying out cross-domain actions 410. Once the cross-domain action 410 has been performed, the new domain-specific voice interface 204 may return to the originating domain-specific voice interface 204 a result of the cross-domain action 410.

For example, sending an email may require cross-domain action 410 between an email domain-specific voice interface and a calendar domain-specific voice interface. The user may verbally communicate with the calendar domain-specific voice interface to identify the user's next appointment. The calendar domain-specific voice interface can perform the in-domain action 408 (i.e., retrieve the user's appointment and calculate the one closest to the current time). If the user changes the appointment time, the calendar domain-specific voice interface may perform in-domain actions 408, such as prompting the user for a new time. The object 404 also may be associated with a cross-domain action 410, namely to request the email addresses of the invitees to the meeting.

In block 816, the originating domain-specific voice interface 204 may complete any remaining in-domain actions 406 of the object 404. Referring to the email example in block 814, the contact domain-specific voice interface 204 may return the email address and may hand over processing to the email domain-specific voice interface 204. The email domain-specific voice interface 204 may then insert the email address into an email and may complete the in-domain action 404 of sending the email. Once the action has been completed, the flow diagram may continue return to block 704 of FIG. 7 to permit a classifier voice interface 202 to process a further user query in the manner discussed above.

Optionally, the domain-specific voice interface 204 may retain dialogue history to allow for follow-up queries. For example, once an email is sent, the recipient may still be considered in-focus by the user, leading to such follow-up queries as "what is his phone number?" The domain-specific voice interface 204 could at this point ask for clarification (e.g., "The phone number of whom?") or could consult cross-domain history and find the in-focus object, in this case, the recipient of the email, and provide the phone number for that contact. The flow diagram of FIG. 8 may then end.

The system described above can handle a wide variety of functionalities due to the two-level approach (i.e., classifier and domain-specific voice interface), while seemingly providing a single-level access for the user. The set of functionalities can be easily extendable due to the structured object-based representation of items and the globally searchable metadata repository. By exposing information from calendar, email, contact lists, and other applications, the voice interface allows the user to move seamlessly among different domain-specific voice interfaces without needing to re-specify various in-focus attributes. It is also possible to combine information from multiple sources to determine when to highlight certain actions. For example, an incoming email message from someone a user is scheduled to have a meeting with in the near future could be flagged as possibly important.

The following provides two examples of a voice interface in accordance with the present disclosure. In a first example, initially, a user may speak a query, such as, "What meetings do I have today?" The classifier voice interface 202 may parse the query to identify the words "meetings" and "today." The classifier voice interface 202 may identify the appropriate domain-specific voice interface 204, namely a calendar domain-specific voice interface, and may determine the attribute-value pair of "period: today." The classifier voice interface 202 may communicate an instruction to the calendar domain-specific voice interface and including an attribute-value pair, such as, {(1) type: domain-specific voice interface 204: calendar; (2) constraints {period: today}}. The calendar domain-specific voice interface may then rank the attribute-value pair and apply a scoring function to determine a utility score for each of the query response templates having the {period} attribute. The calendar voice interface may determine that the query response template having the highest utility score corresponds to the statement "You have [Insert number of Morning meetings, omit if zero] meetings this morning, [Insert number of Afternoon meetings, omit if zero] meetings this afternoon, and [Insert number of Evening meetings, omit if zero] meetings this evening. Your next meeting is in [Insert time interval until next meeting] at [Insert meeting location]." The statements in brackets correspond to information the calendar domain-specific voice interface inserts or omits, if applicable, before audibly presenting a query response based on the query template to the user. The calendar domain-specific voice interface can insert the appropriate information into the query response template, and may instruct the user terminal 102 to generate and audibly output "You have two meetings this morning and three this afternoon. Your next meeting is in thirty-four minutes at your office." This action completes the response to the query, and the calendar domain-specific voice interface may return control to the classifier voice interface 202 to monitor for further queries.

The user may then speak "Do I have any new messages?" If the type of messaging service is not clear from context, the classifier voice interface 202 may ask a query to disambiguate between voicemail and email. If the further constraint of email is spoken by the user, the classifier voice interface 202 may parse the query to determine the attribute-value pair of {attribute: unread} and may communicate an instruction including the attribute-value pair to the mail domain-specific voice interface, such as, {(1) type: domain-specific voice interface 204: mail; (2) constraints: {attribute: unread}}. The classifier voice interface 202 can perform simple natural language processing techniques to determine the attribute/value constraints contained within a user utterance, for instance. The mail domain-specific voice interface may then rank the attribute-value pair and apply a scoring function to determine a utility score for each of the query response templates in the domain having the {period} attribute. The mail voice interface may determine that the query response template having the highest utility score corresponds to the statement "You have [Insert number of new messages, if zero, omit] messages, including [Insert number of urgent message, if zero, omit] from [insert sender name] sent [insert time urgent messages were sent]." The mail domain-specific voice interface may then cause the user terminal 102 to audibly output "There are fifteen new messages including two urgent emails from Bob sent yesterday night." This action completes the response to the query, and the mail domain-specific voice interface may return to control to the classifier voice interface 202 to monitor for further queries.

In a second example, the user may assign the classifier voice interface 202 an identity of "N95." The user may speak the identity to voice activate the classifier voice interface 202. Initially, the user may speak "N95, what meetings do I have today?" The classifier voice interface 202 may parse the query to identify the words "meetings" and "today." The classifier voice interface 202 may identify the appropriate domain-specific voice interface 204, namely a calendar domain-specific voice interface, and may determine the attribute-value pair of "period: today." The classifier voice interface 202 may communicate an instruction identifying the calendar domain-specific voice interface and including an attribute-value pair, such as, {(1) type: domain-specific voice interface: calendar; (2) constraints {period: today}}. The calendar voice interface may determine that the query response template having the highest utility score corresponds to the statement "You have a [Insert meeting type, if any] meeting at [Insert meeting attendee] at [Insert time] and a [Insert meeting type, if any] meeting at [Insert meeting attendee] at [Insert time]." The calendar domain-specific voice interface may insert information on today's meetings into the query response template and may cause the user terminal 102 to audibly output "You have a meeting at client site XYZ Corporation at 9:30 AM and a project meeting in office at 2:00 PM." This action completes the response to the query, and the calendar domain-specific voice interface may return to control to the classifier voice interface 202 to monitor for further queries.

The user may then state the query of "How do I get to XYZ?" The classifier voice interface 202 may parse the words "get to" and "XYZ". The classifier voice interface 202 may parse the query to determine the attribute-value pair of {location: XYZ corporation} and may communicate an instruction including the attribute-value pair to the places domain-specific voice interface, such as, {(1) type: domain-specific voice interface: places; (2) {location: XYZ corporation}}. The places domain-specific voice interface may then rank the attribute-value pair and may apply a scoring function to determine a utility score for each of the query response templates in the domain having the {location} attribute. The places voice interface may use GPS or other positioning system to determine a current location of the user terminal 102, or may prompt the user for the user's current location. The places voice interface may retrieve directions and may then instruct the user terminal 102 to audibly provide the directions to direct the user to XYZ corporation. This action completes the response to the query, and the places domain-specific voice interface may return to control to the classifier voice interface 202 to monitor for further queries.

Instead of simply routing user queries to domain-specific voice interface 204 through presenting the user with a fixed sequence of questions in a fixed order, the example embodiments provide a classifier voice interface 202 as a unified voice interface to intelligently direct the user to one of multiple domain-specific voice interface 204. The voice interfaces in example embodiments provide flexibility over current state-of-the-art dialogue systems that are predominantly built to present a fixed sequence of responses when interacting with the user. The example embodiments provide a domain-independent way to automatically configure domain-specific voice interface 204 by enabling browsing as an information-seeking strategy when interacting with a particular domain-specific voice interface 204. Rather than presenting to the user a fixed set of responses in a fixed order, the example embodiments can determine a dynamic set of appropriate query responses at every dialogue turn to narrow down the list of response options for the following turn.

The classifier voice interface 202 may provide a unified framework to make decisions about content selection and information presentation across multiple domains in a knowledge base. This unified approach can significantly shorten the user interaction for the same tasks. By developing a dialogue rather than relying only on a one-way command interface, the user terminal 102 can provide its interpretation (or interpretations) of the user's query, and the user can interact with the system to improve the system's understanding, rather than allowing the system to respond without confirmation or refinement to a possible incorrect interpretation of the user's query.

Rather than simply prompting a user to select a particular domain in the knowledge base, the classifier voice interface 202 can process the user's query to identify an appropriate domain-specific voice interface 204. Moreover, the classifier voice interface 202 can be locally executed at the user terminal 102, rather than relying on a server-based system, although a server-based system also may be implemented. Additionally, a context registry can be updated based on the user's queries and the current dialogue state to generate a personalized dialogue interaction with the user.

Voice interfaces also may overcome form factor burdens where the user terminal 102 is a mobile phone. The user can be burdened by using a graphics user interface (GUI) on a small display of a mobile phone to complete a task. This usability hurdle becomes increasingly burdensome when the user devote one's full attention to look at the keypad or screen, such as when driving.

Moreover, voice interfaces in accordance with example embodiments can be used without implementing a large vocabulary general syntax model on a mobile platform and hence does not burden the limited resources (e.g., computation, memory, battery power, etc.) of a mobile device. Interpreting some user requests may require a deep understanding of the data and the range of operations that can be requested. Developing a single system that has such "deep knowledge" of a number of domains would lead to difficulties in interpreting the user's requests, since there are often overlaps in vocabulary and operations in differing sub-domains. By taking a "divide and conquer" approach, voice interfaces in accordance with example embodiments can more easily satisfy the user's performance expectations.

The processor 106 described above may include one or more modules that are implemented as hardware, firmware, software, and/or any combination thereof. For example, the processor 106 may include a query parsing module, a query processing module, an instruction module, and other modules to perform the functions and features described herein.

As such, the example embodiments provide an architecture for implementing a dialogue-based voice interface for a wide range of functionalities on a user terminal that is data-configurable, easily personalized, and can handle user preferences and context in an efficient manner.

Lastly, the architecture may provide faster access to information and performance of tasks than typing by efficiently processing speech input from a user. Moreover, the summarization techniques discussed herein can guide the user more quickly than other techniques, especially in comparison with interfaces that receive typed input from a user. For example, by summarizing new emails by topic and sender, the user may jump to the critical message without listening to all the previous messages. From the speech input processing aspect, the architecture may prompt the user to efficiently guide the user to provide additional constraints if information is missing from the initial query to determine what information the user is seeking and/or what task the user desires to perform. If all information needed is present in the initial query or after further prompting the user for the additional information, then the architecture directly and transparently hands over the data to a specific domain-specific voice interface, thus reducing the time needed for a user to complete a task using voice input. Moreover, the architecture discussed herein may combine graphical and voice interfaces to reduce the amount of information audibly presented if there is large amount of data in the response.

The foregoing description was provided with respect to voice interfaces on a user terminal 102. It is understood that the principles described herein may be extended to different types of user terminals 102, including those in wired and wireless networks. The features described in association with a particular example embodiment also may be combined with and/or used instead of features described in association with other example embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining weights for attributes by ranking the attributes based on user interactions with a user terminal;
   storing the weights for the attributes in a memory of the user terminal;
   processing, on the user terminal after the storing, a voice input in a first analysis, wherein the first analysis includes identifying one of the attributes;
   identifying, as a result of the first analysis, one domain of a plurality of domains, wherein the identifying the one domain includes retrieving the stored weight for the identified attribute and identifying the one domain based on the identified attribute and the retrieved weight;
   processing, on the user terminal, the voice input in a second analysis using specialized information of the one domain, wherein each of the plurality of domains comprises different respective specialized information; and
   outputting as synthesized speech a response resulting from the second analysis.

2. The method of claim 1, further comprising
   receiving in the voice input a predefined name; and
   identifying speech in the voice input that immediately follows the predefined name as a query, wherein the first analysis identifies the one of the attributes in the query.

3. The method of claim 2, wherein the predefined name corresponds to an identity assigned to the user terminal.

4. The method of claim 1, wherein the one domain is selected by identifying keywords in the voice input.

5. The method of claim 1, wherein the first analysis includes natural language processing of the voice input.

6. The method of claim 5, wherein the natural language processing includes using knowledge of user data stored on the user terminal that receives the voice input.

7. The method of claim 5, wherein the natural language processing includes identifying, in the voice input, each of one or more words as one of a verb and a noun.

8. The method of claim 5, wherein the natural language processing includes resolving a meaning of ambiguous words in the voice input by determining which of a plurality of meanings is more likely based on usage statistics associated with a user of the user terminal that receives the voice input.

9. The method of claim 5, wherein the natural language processing includes using preferences set by a user of the user terminal that receives the voice input.

10. The method of claim 1, further comprising:
    determining, based on performance of the second analysis, that the second analysis was not appropriate for interpreting the voice input; and
    performing a third analysis with another domain of the plurality of domains in response to the determining that the second analysis was not appropriate for interpreting the voice input, wherein the synthesized speech is specific to the another domain when the third analysis is performed.

11. The method of claim 1, further comprising identifying context information other than the voice input;
    wherein the identifying the one domain is based on the context information.

12. The method of claim 11, wherein the context information comprises one of a date, a time, and a location.

13. The method of claim 1, further comprising identifying a language of the voice input.

14. The method of claim 1, wherein the identified attribute, the specialized information, or both the identified attribute and the specialized information are stored on the user terminal prior to the first analysis.

15. The method of claim 1, wherein the weight of the identified attribute is a predefined user preference.

16. The method of claim 1, wherein the retrieved weight of the identified attribute is updated based upon an outcome of the second analysis.

17. One or more non-transitory computer readable media storing computer-executable instructions which, when executed by a processor, cause the processor to:
    determine weights for attributes by ranking the attributes based on user interactions with a user terminal;
    store the weights for the attributes in a memory;
    process, after the weights are stored in the memory, a voice input in a first analysis, wherein the first analysis includes identifying one of the attributes;
    identify, as a result of the first analysis, one domain of a plurality of domains wherein the identifying the one domain includes retrieving the stored weight for the identified attribute and identifying the one domain based on the identified attribute and the retrieved weight;
    process the voice input in a second analysis using specialized information of the one domain, wherein each of the plurality of domains comprises different respective specialized information; and cause a response resulting from the second analysis to be output as synthesized speech.

18. The one or more non-transitory computer readable media of claim 17, storing further computer-executable instructions which, when executed by the processor, cause the processor to:
receive in the voice input a predefined name; and
identify speech in the voice input that immediately follows the predefined name as a query, wherein the first analysis identifies the one of the attributes in the query.

19. The one or more non-transitory computer readable media of claim 17, storing further computer-executable instructions which, when executed by the processor, cause the processor to:
identify context information other than the voice input;
wherein the one domain is identified based on the context information.

20. The one or more non-transitory computer readable media of claim 17, storing further computer-executable instructions which, when executed by the processor, cause the processor to:
identify a language of the voice input.

21. An apparatus comprising:
a processor; and
memory including computer readable instructions, wherein the memory including the computer readable instructions are configured to, with the processor, cause the apparatus to:
determine weights for attributes by ranking the attributes based on user interactions with the apparatus;
store the weights for the attributes in the memory;
process, after the weights are stored in the memory, a voice input in a first analysis, wherein the first analysis includes identifying one of the attributes;
identify, as a result of the first analysis, one domain of a plurality of domains wherein the identifying the one domain includes retrieving the stored weight for the identified attribute and identifying the one domain based on the identified attribute and the retrieved weight;
process the voice input in a second analysis using specialized information of the one domain, wherein each of the plurality of domains comprises different respective specialized information; and
cause a response resulting from the second analysis to be output as synthesized speech.

22. The apparatus of claim 21, wherein the memory and the computer readable instructions are configured to, with the processor, cause the apparatus to:
identify a language of the voice input.

23. An apparatus comprising:
means for determining weights for attributes by ranking the attributes based on user interactions with a user terminal;
means for storing the weights for the attributes in a memory;
means for processing, after the weights are stored in the memory, a voice input in a first analysis, wherein the first analysis includes identifying one of the attribute;
means for identifying, as a result of the first analysis, one domain of a plurality of domains wherein the identifying the one domain includes retrieving the stored weight for the identified attribute and identifying the one domain based on the identified attribute and the retrieved weight;
means for processing the voice input in a second analysis using specialized information of the one domain, wherein each of the plurality of domains comprises different respective specialized information; and
means for outputting as synthesized speech a response resulting from the second analysis.

24. A method comprising:
determining weights for attributes by ranking the attributes based on user interactions with a user terminal;
storing the weights for the attributes in a memory of the user terminal;
performing, on the user terminal after the storing, a first analysis of a voice input, wherein the first analysis includes identifying one of the attributes;
identifying, as a result of the first analysis, one domain of a plurality of domains, wherein the identifying the one domain includes retrieving the stored weight for the identified attribute and identifying the one domain based on the identified attribute and the retrieved weight;
performing, based on the one domain, a second analysis on the user terminal of the voice input using specialized information of the one domain, wherein each of the plurality of domains comprises different respective specialized information; and
outputting as synthesized speech a response resulting from the second analysis, wherein the identified attribute, the specialized information, or both the identified attribute and the specialized information are based on user data stored on the user terminal prior to the first analysis.

* * * * *

UNITED STATES PATENT AND TRADEMARK OFFICE
CERTIFICATE OF CORRECTION

PATENT NO.         : 9,978,365 B2
APPLICATION NO.    : 12/263012
DATED              : May 22, 2018
INVENTOR(S)        : Mark R. Adler It is certified that error appears in the above-identified patent and that said Letters Patent is hereby corrected as shown below:

In the Claims

Column 21, Claim 2, Line 62:
Delete "further comprising" and insert --further comprising:--

Signed and Sealed this
Sixteenth Day of October, 2018

Andrei Iancu
*Director of the United States Patent and Trademark Office*